July 13, 1954 H. W. LINDSAY 2,683,568

MESSAGE SELECTOR FOR MAGNETIC REPRODUCERS

Filed May 16, 1949 2 Sheets-Sheet 1

INVENTOR,
HAROLD W. LINDSAY.
BY
Lippincott and Smith.
ATTORNEYS.

July 13, 1954 H. W. LINDSAY 2,683,568

MESSAGE SELECTOR FOR MAGNETIC REPRODUCERS

Filed May 16, 1949 2 Sheets-Sheet 2

INVENTOR.
HAROLD W. LINDSAY.
BY
Lippincott and Smith.
ATTORNEYS.

Patented July 13, 1954 2,683,568

UNITED STATES PATENT OFFICE 2,683,568

MESSAGE SELECTOR FOR MAGNETIC REPRODUCERS

Harold W. Lindsay, Redwood City, Calif., assignor to Ampex Electric Corporation, San Carlos, Calif., a corporation of California Application May 16, 1949, Serial No. 93,548

8 Claims. (Cl. 242—55)

Figures 1, 2, 3:
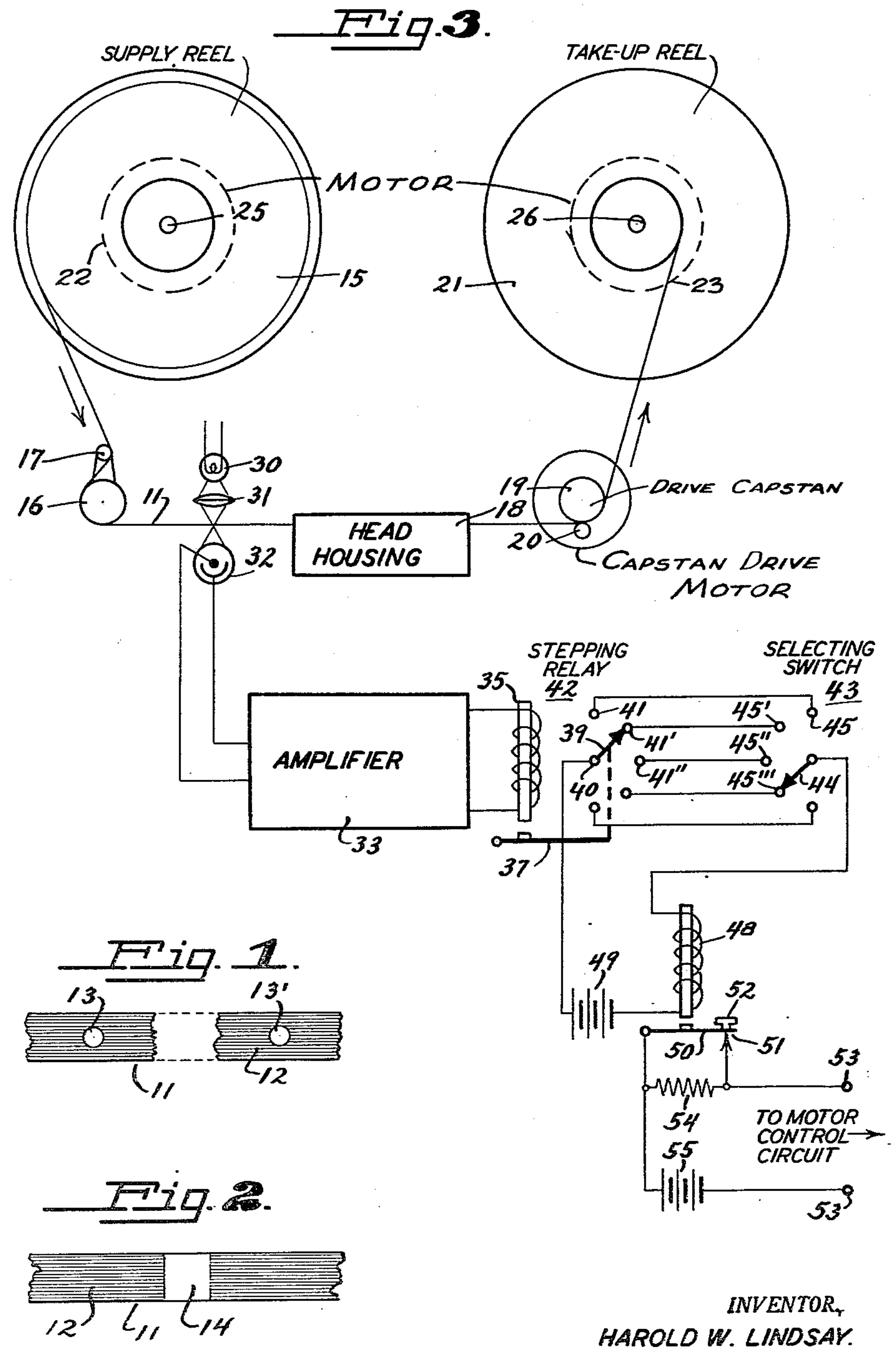

This invention is concerned with magnetic recording apparatus, with particular emphasis placed upon a system designed to provide ready selection of previously recorded sections of a message recorded upon an elongated strip record.

Mechanisms of the type herein defined utilize a flexible tape or strip upon which desired messages are recorded. The strip usually has a thickness of but a few thousandths of an inch and is ordinarily about a quarter of an inch wide. In the alternative, the tape may be made wider so as closely to resemble motion picture film, even to the sprocket holes along the film or strip edges to provide for driving. The tape of the first mentioned variety which will herein be especially considered is usually of paper or plastic stock, such as a cellulose or cellulose acetate preparation. One side of the tape is coated with any suitable substance, such as iron oxide, to adapt it for magnetic recording. The tape is customarily stored upon a pay-off or supply reel or magazine upon which the tape to be utilized has been wound or otherwise stored. The tape, as it is utilized, is unwound or otherwise removed from the reel or magazine, and fed to a head housing which may comprise a magnetic eraser, a magnetic recording head, and a magnetic reproducing head, or any of these instrumentalities, over which and relative to which the tape or strip is fed.

Since the method of feeding a strip of this character may be of any desired form and since the general nature of the head housing may be of any desired type, these constructions will not be described herein in detail. However, one particularly suitable form of tape feed is disclosed in applicant's copending U. S. patent application entitled, "Alining Mechanism for Tape Recordings" filed March 21, 1949, as Serial No. 82,692 now Patent No. 2,622,813.

Also, the arrangement of the tape relative to the head housing is disclosed in applicant's copending U. S. patent application entitled "Recording Head Assembly" filed March 21, 1949, as Serial No. 82,695. The former of these named patent applications discloses the capstan type of tape strip drive; the latter patent application discloses a system for locating and positioning a recording strip or tape relative to the various magnetic heads in the head housing.

The present invention, having as one of its primary features and advantages that of providing a convenient means for making a program selection of certain sections of the record strip or tape, is so arranged that at time periods which can be selected under the control of an operator of the mechanism, for instance, rapid driving mechanisms may be caused to take over the tape feed to the exclusion of the more slowly advancable normally operating capstan type of tape drive. In this rapid type of tape or strip feed it is desirable that marking indicia be placed upon the tape or strip at appropriate points, such, for instance, as the commencement and termination of the particular program, or, for instance, at regularly recurring spacings on the strip itself, such, for example, as each foot of tape or strip length. Where the latter type of marking indicia are utilized it is preferable for the operator to log the point or tape area where the program material of each tape commences and ends. Where this is done it is apparent that through appropriate controls it is relatively easy promptly to locate at a later time some particular selected portion of the recorded message.

In accordance with the present invention appropriate means are coordinated with the tape or strip in such a way that it becomes possible through the movement of the tape or strip and the thereupon recorded marking indicia to select purely automatically a predetermined or selected number of marking indicia points and through this selection then to provide a control of the drive operation. To this end, signals which indicate passage of marking indicia relative to a selected pick-up point may be caused to control the operation of a so-called stepping relay which, in turn, is connected with a selection mechanism or switch in such a way that with a rapid tape motion having been initiated through an appropriate drive motor circuit, the tape motion may be arrested or stopped at time periods when the stepping relay position coincides with a preset selection of the selection switch mechanism, the selection switch mechanism having been set to locate a particular tape or strip section desired for reference or other purposes.

Under some conditions it is desirable that this rapid motion of the recording strip or tape be either in the forward or in the reverse direction, so that, for instance, in the advancing or forward direction the tape will feed onto the tape reel or into a storage magazine of other character, while in the reversing direction the tape will feed off the take-up reel (or from the magazine) and onto the supply reel (or storage magazine) which, under such conditions, would in the case of a storage reel be rotated in a direction counter to that in which it would normally turn in routine operation. Thus, if it be desired to locate one particular section of the tape the selection switch mechanism may be set to the particular tape or strip location desired through the coordinated and connected relationship between the stepping relay and the selection switch.

The instantaneous position of the tape or strip then is ascertainable, depending upon whether the tape or strip has moved beyond the point at which the marking indicia are selected relative to the desired section of the pre-recorded tape or strip message has yet to reach, by the unwinding operation, the point at which the indicia are selected. This will determine whether the desired tape section can be most readily reached by rapidly advancing the tape or strip in its normal strip feed path, or whether it is desirable to reverse this direction.

To achieve this result an appropriate mechanism or switching gear to set up such conditions of operation is provided. The tape or strip take-up reel will serve to draw or pull the tape from the supply reel for a forward tape motion operation, but, for reversing the operation, the supply reel will be rotated in its opposite direction and will, during that particular time, serve as a take-up reel and wind the tape or strip off what would normally be the take-up reel and onto the supply reel.

The stepping relay which controls this advancing or reversing motion of the tape may then be so controlled as to advance one step each time any marking indicia pass the point at which such indicia are selected. In the alternative a counter mechanism or circuit may be included and cause the stepping relay to advance in a step-by-step manner for instance, only after a selected number of such marking indicia pass the selected pick-up point. In any event, with the initiation of a rapid drive of the tape in either direction the drive operation normally continues until the stepping relay position is such relative to the pre-set selection switch as, for instance, to close an appropriate circuit which will bring about an arresting of the motor drive. This then would select the desired tape or strip section which had been previously desired in accordance with the pre-set position of the selection switch. At such times as this selection is made the drive motors for feeding the tape or strip from the supply reel or magazine and into the take-up reel or magazine, or vice versa, serve as main driving motors. At times when the normal tape feed is in operation the same drive motors, while remaining in operation, function generally to operate only as underexcited motors and merely serve then as tensioning means for the driven tape or strip.

Within the scope of this invention it, of course, becomes one of the objects to provide a convenient and yet economical and satisfactory mechanism to select desired portions of a recorded strip or tape so that the record can either be re-run for listening purposes or it can be re-run for purposes of matching it or mixing it with other records, or for any other purpose desired.

A further object of the invention is that of providing ways and means to select desired portions of a previously recorded record without taking recourse to time-consuming and lengthy operations which would normally be required to make this selection.

Other objects of the invention are those of providing a convenient and yet suitable form of arrangement for selecting desired portions of a record strip or tape in accordance with marking indicia placed thereupon either prior to recording or at the time the tape is manufactured, so that the markings generally appear in regularly spaced sequence, or where the markings or other indicia are placed upon the tape or strip to indicate the time of commencement, for instance, of any particular recording at the time of termination of this particular recorded feature.

Further objects of the invention are those of providing a record strip or tape itself with appropriate marking indicia so that desired strip or tape sections may readily be located during the course of operation to record or reproduce messages placed thereupon by any desired method of recording.

Still other and further objects of the invention are those of providing a convenient means for ascertaining or determining recorded programs or sections of a record strip where the utilized means can be added to the already existing recording apparatus at a minimum of expense, or where they can be incorporated with apparatus to be manufactured with minimum inconvenience and expense and with a minor amount of additional equipment to provide the desired results.

Other and further objects and advantages of the invention will become obvious and apparent from reading the following description and claims in connection with the accompanying drawings.

Figure 4:
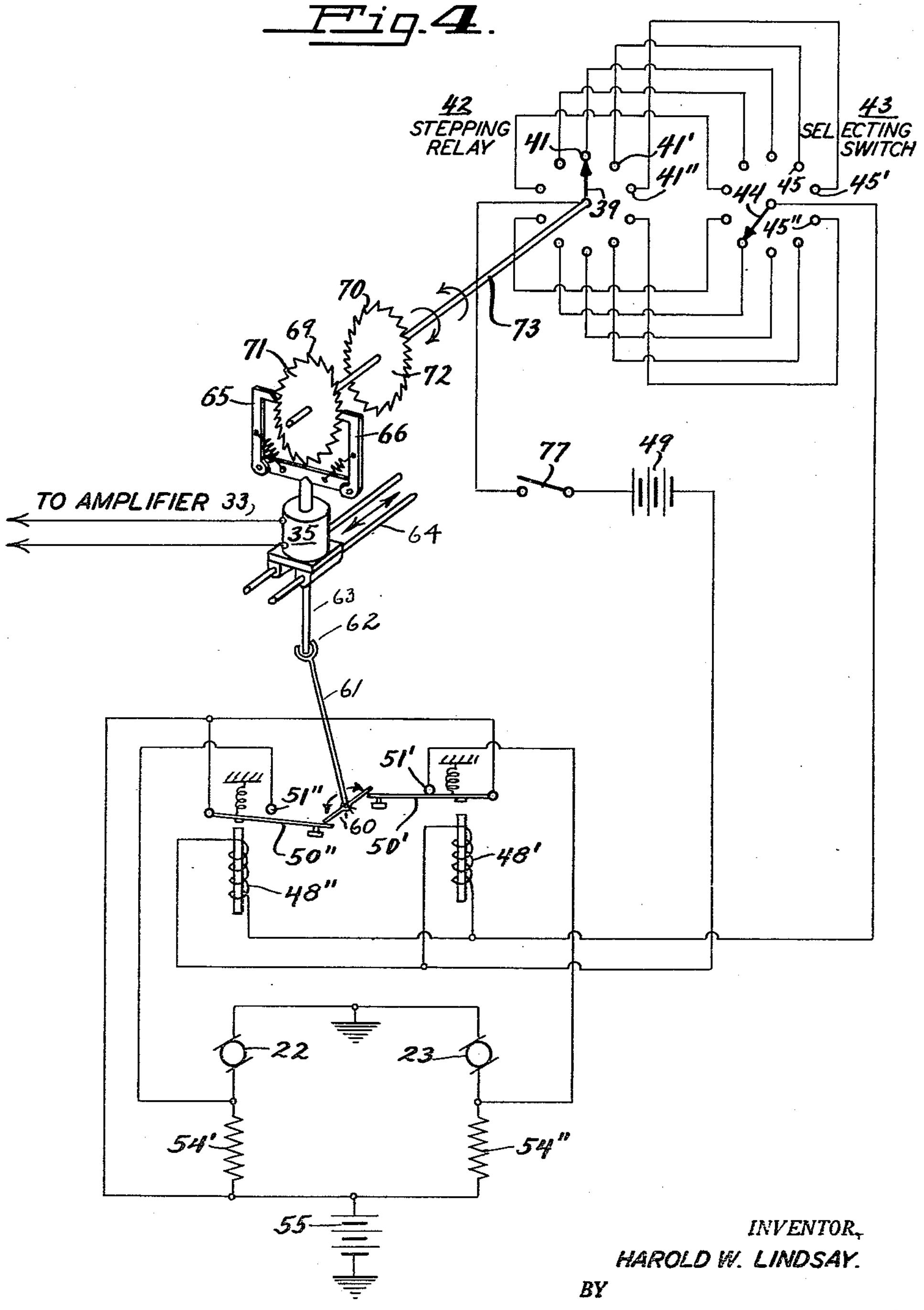

In the drawings, Fig. 1 illustrates in plan view a section, considerably enlarged over normal size, of one form of tape or strip carrying the aforesaid marking indicia;

Fig. 2 illustrates a modification of the tape of Fig. 1;

Fig. 3 is a schematic representation of one form of tape drive and control arrangement suitable for rapidly advancing a tape or strip and withdrawing it from a magazine in order to locate desired sections upon which recordings of messages have previously been made; and Fig. 4 is a schematic representation of a modified portion of Fig. 3 to show a tape or strip feed mechanism capable of moving a record tape or strip rapidly in either of two directions, forward or back, relative to a head housing wherein various recording heads are located.

Referring now to the drawings, Fig. 1 represents schematically a flexible recording tape or strip 11 whereupon a suitable coating 12 of recording material has been placed by any appropriate method. Located at regularly spaced intervals on the tape or strip are suitable marking indicia such as those designated at 13 and 13'. Depending upon the method of marking adopted, there can be between the points 13 and 13' a distance and separation coinciding with the tape or strip space or distance required to record a selected program or, in the alternative, the spacing between the indicial points 13 and 13' may be some particular strip length distance selected arbitrarily so that within a reasonable time of normal tape feed operation a plurality of such marking indicial points would be moved relative to a selected pick-up point within a unit time period. In some instances motion picture film strips, particularly those used for recording, have been marked with space indicia at regular intervals of the order of twelve inches.

The form of indicia represented at 13 and 13' is generally not of any considerable moment insofar as the shape of the designation area is concerned, but for the purpose of the present invention it is generally desired that the indicia shall be either transparent to light or capable of reflecting light directed thereupon from the surface to a light transmitting element, such as a photocell, for utilization purposes. Thus, the marking indicia may be placed either internally of the tape or elsewhere, as desired. In the alternative the marking indicia may be provided by an area giving a different light reflection from that normally obtained from the tape surface itself, so that a photocell arranged to receive light directed to the tape or strip and reflected therefrom shall produce a different output current at time periods coinciding with those at which the indicia are in the path of the light beam, indicated particularly in Fig. 3.

The significant feature here is that the points of indicia shall provide a response characteristic or signal which can be utilized in the manner explained particularly in Figs. 3 and 4, for instance, to determine selection of desired strip or tape sections or areas. For the purpose of selecting these sections it is naturally desirable in the initial recording that some log be kept to indicate where the message desired has been positioned on the tape and from this log the selection can readily be made by following the selection methods herein disclosed.

Referring to Fig. 2, it will be seen that a slightly different type of marking indicia 14 can be applied upon the tape. Such a marking might, for instance, be in the nature of a white or high reflecting coating smeared or painted across the strip as it is moved. In the alternative the coating might readily be formed of such material as the well-known cellulose tape pasted across the tape or strip 11 so that when moved relative to a photocell and light source a different type of out-put signal will be released from the photocell arranged to receive light directed through or reflected from the tape or strip, as above explained. The significant characteristic is that the message tape or strip area upon which the marking indicia are placed usually have a different transparency or reflectivity for each such area than would an untreated tape or strip.

Referring now to Fig. 3 of the drawings, the tape or strip 11 is shown as being contained within a supply magazine of any desired type, illustrated by way of example as the supply reel 15, from which it may be withdrawn through rotation of the reel to move in the direction shown by the arrow adjacent to the tape. The tape is normally fed over an idler 16 and tensioned by a tensioning element 17, as is well known. The tape, as it is then withdrawn from the supply magazine or reel 15, is passed through a head housing 18 in a manner such as that explained in applicant's heretofore mentioned copending U. S. patent application entitled, "Recording Head Assembly," purely by way of illustration.

The tape so located is then withdrawn or pulled through the head housing by a capstan type of drive, conventionally indicated at 19, with the roller 20 being so arranged as to feed the strip into the take-up magazine or reel 21. The drive mechanism for the tape at this point may be in accordance with the description set forth in applicant's copending U. S. patent application also mentioned above and entitled "Alining Mechanism for Tape Recordings," for instance.

The tape drive provided by the capstan 19 is usually under the control of a stabilized or synchronous motor (not shown). Proper tension of the tape is provided by the motors 22 and 23 (diagrammatically shown by Fig. 4) arranged to rotate the spindles 25 and 26. The motors under these circumstances operate as underexcited motors rotating in opposite directions and serving to maintain the tape strip tight with the motors driving the spindles 25 and 26 in the direction to provide for tensioning the tape or strip during the winding onto the take-up reel from the supply reel with the strip moving in the direction shown by the arrows in Fig. 3. So arranged the under-excited motors turn spindles 25 and 26 slowly in clockwise and counter-clockwise directions, respectively. To withdraw the tape or strip from the take-up reel or magazine 21 and into the supply magazine or reel 15 the motor driving spindle 25 will take control as explained in the description of Fig. 4.

So that the marking indicia represented at 13, 13' and so on of Fig. 1, or 14 of Fig. 2 may be utilized to select desired portions of previously recorded messages on the tape 11 a light source 30 and an asociated optical system, conventionally represented at 31, is arranged to shine light through the tape toward a photocell 32, or, in the alternative, to direct light to the tape surface from whence it may be reflected to the same or like type photocell 32. Thus, with a tape or strip 11 bearing indicia such as those illustratively represented by Figs. 1 and 2 moving relative to the point at which light from the source 30 passes through or reflects from the tape output currents will flow from the photocell and may be caused to influence an amplifier 33 of any desired type represented as connected to the photocell 32.

The amplifier 33 may be either of the D. C. or the A. C. variety. Such an amplifier is so well known in the art as to require no illustration and may include, for example, one or two or more stages and follow generally the form of amplifying devices used in connection with facsimile transmission systems. The tube types used within the amplifier and the form of coupling herein included likewise, per se, form no part of this invention. Suffice it to say, therefore, that the output current flowing from the amplifier at time periods of activation of the photocell 32 shall be such as to cause an energization of the conventionally represented relay coil 35. Thus, the amplifier 33 comprises a suitabel number of stages to bring about this result, depending upon whether the output to control the relay winding 35 is derived from a tube anode or cathode circuit.

Energization of the relay winding 35 causes the relay armature 37 to be moved to control the instantaneous position of a switch contactor 39 which is arranged to rotate about a center point 40 to contact switch contact points 41, 41', 41'' and so on. The stepping relay is generally designated at 42.

Under some circumstances it may be desirable that the relay winding 35 become energized only after a selected number of marking indicia are moved relative to the photocell by the tape advancement. This type of operation would be used mainly where the marking indicia on the tape or strip 11 are placed at regular intervals and are relatively close together so that a stepping of the relay switch arm 39 for each indicial point is unnecessary. Under these circumstances any suitable form of counter mechanism may be included within the amplifier. Many forms of electronic counters are known and used and therefore none is herein illustrated, although, purely by way of example, it is pointed out that one form of counter mechanism which might be used has been illustrated in the U. S. patent to White, No. 2,113,011, granted April 5, 1939, although here again other forms of counter circuits may be employed, such as utilized, for instance, in various modifications of the well-known Eccles-Jordan flip-flop scalers.

A selection switch conventionally represented at 43 is provided for cooperative association and operation with the stepping relay 42. The selection switch 43 also has a switch contact armature 44 which may be manually positioned to contact one of a group of contact points 45, 45', 45'' and so on. The switch arm 44 of the selection switch is connected to one end terminal of the relay winding 48. The other terminal of the relay winding 48 connects to one terminal of the conventionally represented source 49. The other terminal of the source 49 connects to the switch arm 39.

Thus, at time periods of coincidence between the position of the switch arm 39 of the stepping relay 42 and the switch arm 44 of the selection switch 43 current from the source 49 will flow through the relay winding 48. According to the illustrated example this would be at a time period when the switch arm 44 was in the position indicated and the switch arm 39 had advanced two contact points in the clockwise direction.

The relay winding 48, when energized, is arranged to draw the armature 50, of the snap relay type, upwardly from the contact point 51 so as to break contact therewith and to maintain the said contact broken until later manually closed, for instance, by pressure exerted on the closure button 52. Between the relay armature 50 and the contact point 51 there is included a resistor unit 54 which is short circuited at time periods of closure of the relay armature 50 upon the contact point 51. At other times the resistor 54 is included as a series element in the circuit existing between the terminals 53 and 53' through the current source conventionally represented as the battery 55. The connections 53 and 53' are conventionally intended to represent the terminals of the motor (not shown) used for driving or rotating the shaft or spindle 26 of the take-up reel or magazine 21.

Thus, at time periods of closure of the relay armature 50 upon the contact point 51 the resistor 54 will be short circuited and the speed of the take-up motor will increase. This would occur at a time coinciding with that at which it is desired rapidly to draw the tape or strip 11 through the head housing 13 and into the take-up reel or magazine to select a particular section of the tape for monitoring or replaying purposes. In the instance illustrated by Fig. 3 this would represent the particular section of the tape corresponding to the setting of the selection switch at contact point 45'''. It would illustrate also that the position of the tape as it is shown by the drawing is two marking indicia spaces away from that section of the tape which is desired.

Because the tape moves, according to normal operations, relatively slowly (say, for instance, only between fifteen and thirty inches per second) it, of course, would take a considerable amount of time to move a long section of tape such as that represented by several hundred feet of recording if normal tape speed were relied upon. Therefore, causing the drive motor for the take-up reel or magazine to take over to the exclusion of the capstan drive makes possible a more rapid selection of program.

In the modification of the invention shown by Fig. 4 provision has been made for driving the tape either forward or in reverse by following the principles set forth in accordance with the disclosure of Fig. 3. In Fig. 4, accordingly, only a portion of the complete mechanism has been illustrated. This comprises the portion of the mechanism shown by Fig. 3 to the right of the amplifier 33 (which may or may not include a counter circuit, as above described).

The arrangement of the Fig. 4 is a modification providing a separate driving motor for each of the supply reel or magazine 15 and the take-up reel or magazine 21. The separate driving motors may also, where desired, be included with the system of Fig. 3 where, as in Fig. 4, for the normal type of strip or tape advance each motor operates underexcited and serves as a strip or tape tensioning mechanism. In this state the supply reel motor will rotate clockwise (in the illustrated example of Fig. 3, for instance), while the take-up reel motor may be considered as rotating counterclockwise.

For a normal or far a rapid type of tape or strip advance, whether the tape or strip 11 is to be wound upon the take-up reel or re-wound upon the supply reel, will determine which of three possible positions of the switch control arm 60 is selected for controlling the instantaneously effective motor operating state. Any convenient means (such as a control knob, not shown) may be used to rotate the switch control arm 60 about the indicated pivot point. The arrows pointing in both a clockwise and a counterclockwise direction indicate that the switch arm may be rotated for purposes later herein to be explained. As shown, the switch control arm 60 is in a position such that the motor 23 (which may be assumed to be the motor to drive the take-up reel 21 or tension the strip therein), will operate fully excited because resistor 54'' is short-circuited and current can flow from source 55 directly to motor 23 by short circuit provided about the resistor 52'' through contact 51' and switch arm 50'. However, at such a time motor 22 (which now may be assumed to be the motor for tensioning the strip in the supply reel) will operate underexcited by reason of the inclusion in series therewith of resistor 54'.

If the switch control arm 60 is rotated by any convenient means such as a knob in a clockwise direction from that position shown it can be seen that the contact between switch arm 50' and contact point 51' will be broken. Likewise, the switch control arm 60 will be moved to a position such that switch contactor 50'' can be moved over against the contact point 51'' thereby to close a circuit which will short circuit the resistor 54' which is serially connected with the motor 22 for the supply reel drive.

If the switch control arm 60 is in a position intermediate that shown and that which will permit switch arm 50'' to close against contactor 51'' it can be seen that neither switch arm 50' nor 50'' can be closed upon their contacts 51' and 51'', respectively. In the latter position the resistors 54' and 54'' will be serially included with the motors 22 and 23, respectively, to cause them to operate underexcited.

Likewise, as the switch control arm 60 is rotated in a clockwise manner about the indicated pivot point the thereto attached arm 61 will move the forked end 62 to cause it to move in turn the stud 63 projecting from the relay coil 35 whereby the relay, as a unit, may be moved to the right from the position shown along the guide members 64.

As was explained in connection with Fig. 3 the relay coil 35 serves to operate and control the stepping relay 42.

Accordingly, to provide for a clockwise rotation of the switch contactor 39 of the stepping relay 42 in Fig. 4 energization of the relay winding 35 will cause the arms 65 and 66, which serve as pawls on the ratchet wheels 71 and 72, to be drawn downwardly. The ratchet wheels 71 and 72 are secured to the shaft 73 in spaced relationship and are provided with ratchet teeth 69 and 70 which face in opposite directions. Accordingly, in the position shown, each energization of the relay coil 35 will cause the pawl 66 to engage one of the teeth 69 of the ratchet wheel 71 to rotate it, together with the shaft 73 and the switch arm 39, one step in a clockwise direction. As this is occurring the pawl 65 is so set up that it will slip past the ratchet teeth 69 in the opposite face of the ratchet wheel merely by forcing the pawl outwardly against the pressure of the indicated spring.

When the switch control arm 60 is moved to a position such that it will permit the switch arm 50'' to close upon the contact point 51'' the relay winding 35 will move, under the control of the schematically represented linkage mechanism, to the right along the slide rods 64 from the position shown. Under these circumstances output pulses from the amplifier 33 which energize the relay coil 35 will again cause the pawls 65 and 66 to be drawn downwardly but at this time the pawl 65 will act upon the teeth 70 of the ratchet wheel 72 so as to rotate it, together with the shaft or spindle 73 and the switch contactor 39, counterclockwise. At this time the pawl 66 will merely ride over the teeth 70 against the pull exerted by the conventionally indicated spring attached thereto.

It thus can be seen that for this type of operation the switch 77 will be closed so that current can flow from the source 49 through the relay windings 48' and 48'' at time periods when the switch contactor 39 of the stepping relay 42 closes a circuit through one of the therewith associated contact points, the switch arm 44 of the selecting switch 43, the source 49, and the relay windings 48' and 48''.

Prior to the occurrence of the last described effect the switch control arm 60 will be moved to the position for the desired type and direction of tape motion. If it be desired to unwind the tape rapidly from the supply reel or magazine and into the take-up reel or magazine the switch control arm 60 will be permitted to remain in the position indicated by Fig. 4. This then will short-circuit resistor 54'' which is serially connected between the source 55 and the motor 23 so that the motor changes its operational state from that of being underexcited to full excitation and rapidly moves the tape or strip to the exclusion of the normal strip drive mechanism 19. At times when the tape or strip has reached a location coinciding with the previously selected position on the selecting switch 43 it will be apparent that a coinciding position of the stepping relay switch arms will cause current to flow through the relay winding 48', as well as 48'', to open switch arm 50' from the contact 51' whereupon the motor 23 will be slowed by reason of its return to an underexcited state of operation.

If on the other hand it be desired to reverse the strip or tape feed and to re-draw it into a supply reel or magazine 15, switch control arm 60 will be rotated in a clockwise direction from that shown so that switch contact arm 50'' may be permitted to close (or manually closed, as desired) against contactor point 51''. This will short-circuit resistor 54' which is serially connected between the source of current 55 and the motor 22 and permit the motor then to operate in a fully excited state. Except for the direction of tape feed the operational conditions which are thus instituted will be substantially the reverse of those hereinabove explained.

For normal speed tape or strip advance under the control of the capstan drive 19 the switch control arm 60, as above stated, may be rotated clockwise from the position shown to a position such that neither of the switch arms 50' or 50'' can close upon the contacts 51' and 51'', respectively. This will thus insure an operation of each of the motors 22 and 23 in an underexcited state. In addition, the control switch 77 may at these times be open so that incidental operation of the relay core 35 to change the position of the contactor 39 of the stepping relay 42 will be ineffective to control the operation of either of the relay windings 48' or 48'' because for normal speed tape or strip advance this control now becomes unnecessary. Obviously, a switch may be included in the supply to relay coil 35 to prevent operation of the relay with the switch open at normal speed tape drive.

The forms of illustrated control for rotating the contactor 39 of the stepping relay; for slidably moving the relay winding 35 back and forth; for controlling the operation of the switch arms 50, 50' and 50''; for permitting closure of the switch arms 50, 50' and 50'' against the contact points thereof; and also for controlling the short-circuiting of the motor resistors 54, 54' and 54'' constitute mere schematic showings and are not intended to be other than illustrative of the principle of operation.

As an alternative to the utilization of the light source and phototube for developing the pulses to control the operation of the step relay may be developed and generated by arranging pecker fingers to protrude through punched openings of the tape or strip as it is fed through the mechanism. Alternatively, also, fingers of this type may be arranged to contact strip elements attached to one side or the other of the tape and to count the number of such units passed in any selected time whereby the general effect obtained through the purely electronic phototube operation depicted particularly by Fig. 3 of the drawings will be attained.

Having now described the invention, what is claimed is:

1. In a system for selecting previously recorded messages formed upon a record strip arranged to be movable relative to a selection point, a driving capstan means for normally moving the strip relative to the selection point at one normal strip-feed speed so as to permit translating the recorded message into usable message indications, a first motor to move the strip relative to the selection point in a forward direction at a rate of speed materially greater than the normal strip-feed speed, a second motor to move the strip relative to the selection point in a backward direction at a speed greater than the normal strip-feed speed, each of said motors being adapted, during operation, to serve as the instantaneously effective strip moving means, means to maintain the said motors in an under-excited state during normal strip drive so that the strip is tensioned, means for indicating the strip section instantaneously within the general region of the selection point, means to select a different strip section to be moved within the region of the selection point, and means operable with a lack of identity between the instantaneously located strip section and the desired strip section to convert one of the motors to a full excited state to initiate rapid strip motion and to maintain such motion for time periods of a duration sufficient to move the strip at the rapid speed to place the selected strip section in the region of the selection point and to establish thereby coincidence of indication of the instantaneously present and the selected strip sections.

2. In a system for selecting previously recorded messages formed upon a record strip arranged to be movable relative to a selection point, drive means for normally moving the strip relative to the selection point at one speed, a supply reel for housing the strip prior to withdrawal and a take-up reel in which the strip is stored after withdrawal from the supply reel, individual underexcited motors for tensioning the strip on each of the reels, the underexcited motor associated with the supply reel being adapted to rotate in a direction to oppose withdrawal of the strip and the underexcited motor of the take-up reel being adapted to rotate in a direction to draw the strip onto the reel, means to indicate the strip section instantaneously within the region of the selection point, a selection switch for selecting a different strip section to be moved within the region of the selection point, means operable with a lack of identity between the instantaneously located strip section and the desired strip section to convert one of the motors to a fully excited state and thereby to overcome the driving effect of the normal drive means for the strip so as to feed the strip at a rapid rate with respect to the normal strip feed into one of the supply and the take-up reels, the direction of feed being determined in accordance with the position of the selected strip section relative to the instantaneous strip position, and means to restore the selected individual drive motor to its normal underexcited state at the time when the selected strip section has been fed rapidly to the selection point.

3. In a system for selecting previously recorded messages formed upon a record strip arranged to be movable relative to a selection point, a supply reel and a take-up reel for the strip, drive means for normally drawing the strip from the supply reel to the take-up reel and for moving the strip relative to the selection point at one substantially constant speed, a first underexcited motor positioned to rotate in a direction for tensioning the strip upon the supply reel and tending to oppose withdrawal therefrom, a second underexcited motor for tensioning the strip fed onto the take-up reel and rotating in a direction to tend to feed the strip thereon, means to indicate the strip section instantaneously within the region of the selection point, a selection switch for selecting a different strip section to be moved within the region of the selection point, means operable with a lack of identity between the instantaneously located strip section and the desired strip section to convert one of the motors to a fully excited state and thereby to overcome the driving effect of the normal drive means for the strip so as to feed the strip at a rate rapid with respect to the normal strip feed relative to one of the supply and the take-up reels determined in accordance with the position of the selected strip section relative to the instantaneous strip position, and means to restore the supply or take-up reel drive motor selected for strip driving to its normal underexcited state at the time when the selected strip section has been fed to the selection point.

4. In magnetic tape recording apparatus for use with a magnetic tape having recordings on successive tape portions and having indicia thereon serving to indicate location of the recordings, separate supply and take-up reels upon which the magnetic tape is wound, means engaging that portion of the tape extending between the reels and serving to feed the tape at a constant rate for magnetic reproduction of the recordings, drive means for at least one of said reels including an electric motor, said drive means being independent of said tape feeding means and serving to move the tape from one reel to the other at a rate relatively rapid compared to the normal rate for reproduction, means located between the reels serving to translate said indicia into electrical control pulses, an operating circuit for said motor, and means responsive to said electrical control pulses for controlling said motor circuit whereby said motor either drives the tape at said rapid speed or permits said tape to be driven by said first named tape driving means for normal reproduction of a recording.

5. Apparatus as in claim 4 in which said last named means includes a multiple contact switch operated step by step by said control pulses, and a manually set multi-contact selector switch which can be positioned to pre-select a recording to be reproduced.

6. In magnetic tape reproducing apparatus for use with magnetic tape having magnetic recordings on successive tape portions and having longitudinally spaced indicia thereon serving to indicate the location of the recordings, separate supply and take-up reels upon which the end portions of the magnetic tape are wound, means engaging that portion of the tape extending between the reels for feeding the tape at a constant speed during normal reproducing operations, means including an electric motor for driving the take-up reel to move the tape rapidly compared to the normal reproducing speed, said last named means being independent of said tape feed means, photo-electric means located between the reels and serving to translate said indicia into electrical control pulses, an electrical circuit for said motor and means responsive to the control pulses for controlling said circuit to cause the motor to drive the tape at said relatively rapid rate or to permit the tape to be driven by said first named driving means for normal reproduction.

7. Apparatus as in claim 6 in which said last means comprises a multi-contact relay switch operated step by step by said control pulses, and a manually set multi-contact selector switch having its contacts connected to the contacts of said relay switch, another relay switch included in the motor circuit and an energizing circuit including the winding of said last named relay, said relay multi-contact switch, and said manually set switch.

8. Apparatus as in claim 6 together with a motor for driving the supply reel for a rewind operation, an energizing circuit for said rewind motor, and means for causing the energizing circuit of the rewind motor to be controlled by the aforesaid means for controlling the motor for driving the take-up reel.

References Cited in the file of this patent

UNITED STATES PATENTS

| Number | Name | Date |
|---|---|---|
| 1,442,682 | De Forest | June 16, 1923 |
| 1,848,663 | Robinson, Jr. | Mar. 8, 1932 |
| 1,880,240 | Czeija | Oct. 4, 1932 |
| 2,088,451 | Thomas | July 27, 1937 |
| 2,304,913 | Herzig | Dec. 15, 1942 |
| 2,305,085 | Jacob et al. | Dec. 15, 1942 |
| 2,327,956 | Begun | Aug. 24, 1943 |
| 2,328,055 | Clough | Aug. 31, 1943 |
| 2,377,323 | Carlson | June 5, 1945 |
| 2,396,409 | Berzer | Mar. 12, 1946 |
| 2,484,552 | Camras | Oct. 11, 1949 |
| 2,496,103 | Neufeld | Jan. 31, 1950 |
| 2,514,578 | Heller et al. | July 11, 1950 |